United States Patent [19]

Hernandez et al.

[11] Patent Number: 5,021,973

[45] Date of Patent: Jun. 4, 1991

[54] METHOD FOR ASSISTING THE OPERATOR OF AN INTERACTIVE DATA PROCESSING SYSTEM TO ENTER DATA DIRECTLY INTO A SELECTED CELL OF A SPREADSHEET

[75] Inventors: Irene H. Hernandez; Beverly H. Machart, both of Austin, Tex.

[73] Assignee: International Business Machines Corporation, Armonk, N.Y.

[21] Appl. No.: 339,852

[22] Filed: Apr. 14, 1989

Related U.S. Application Data

[63] Continuation of Ser. No. 819,190, Jan. 16, 1986, abandoned.

[51] Int. Cl.⁵ .............................................. G06F 3/14
[52] U.S. Cl. ................................... 364/518; 364/521; 340/709; 340/724
[58] Field of Search ............... 364/518, 521, 900, 200, 364/300; 340/724, 727, 709, 750

[56] References Cited

U.S. PATENT DOCUMENTS

| | | | |
|---|---|---|---|
| 4,412,294 | 10/1983 | Watts et al. | 364/518 |
| 4,455,618 | 6/1984 | Walden et al. | 364/900 |
| 4,481,603 | 11/1984 | McCaskill et al. | 364/900 |
| 4,528,560 | 7/1985 | Bergermann et al. | 340/709 |
| 4,566,127 | 1/1986 | Sekiya et al. | 382/56 |
| 4,602,251 | 7/1986 | Sawada et al. | 340/724 |
| 4,642,790 | 2/1987 | Minshull et al. | 340/724 |
| 4,646,250 | 2/1987 | Childress | 364/518 |
| 4,649,513 | 3/1987 | Martin et al. | 364/900 |
| 4,677,585 | 6/1987 | Ikegami et al. | 364/900 |
| 4,713,754 | 12/1987 | Agarwal et al. | 364/200 |
| 4,723,210 | 2/1988 | Barker et al. | 364/300 |
| 4,739,477 | 4/1988 | Barker et al. | 364/300 |
| 4,763,356 | 8/1988 | Day, Jr. et al. | 379/368 |

OTHER PUBLICATIONS

Flast et al., "Macintosh Spreadsheets", McGraw Hill, 1976, pp. 79-89.
Que Corporation, "Using 1-2-3", Que Corporation, 1987, pp. 293-317.
Taylor, J., "A New Face for Spreadsheets", PC Magazine, 12/87, pp. 103-118.
Stockwell, D. A., "Display with Partitioned Slow Scroll", IBM Technical Disclosure Bulletin, vol. 23, No. 4, 9/80, pp. 1512-1513.
Anderson, D. C., "Closing the Gap: A Workstation—Main Frame Connection", Computers in Mechanical Engineering, May 1986, pp. 16-24.

*Primary Examiner*—Dale M. Shaw
*Assistant Examiner*—Phu K. Nguyen
*Attorney, Agent, or Firm*—Richard C. Cummins

[57] ABSTRACT

A method for use in an interactive data processing system which includes a processor for controlling data entered into said system from an input device, and a display device which functions to display a spreadsheet shell that is defined by an application program. Data is entered into said system interactively by an operator through an input device, such as a keyboard. The operator selects a cell of the spreadsheet in accordance with the type of cursor positioning mechanism provided in the system. Once a cell is selected, an editing cursor is displayed in the cell at a predetermined first entry position. As each character of data is entered, it is displayed in the cell, just as it was entered. The data is neither formatted nor calculated if it was a formula. The operator indicates to the system when data entry is complete, by pressing an "Accept" key which may be a dedicated key, preprogrammed key, or one of the function keys on the keyboard. Various conventional editing actions of the data in the cell are provided, such as deleting characters and scrolling at the edge of the cell.

6 Claims, 4 Drawing Sheets

|   | A | B | C | D | E | F |
|---|---|---|---|---|---|---|
| | | BUDGET | REPORT FOR | 1986 | | |
| 1 | | JANUARY | FEBRUARY | MARCH | APRIL | MAY |
| 3 | ITEM 1 | 999.99 | | | | |
| 4 | ITEM 2 | 129.99 | | | | |
| 5 | ITEM 3 | 769.77 | | | | |
| 6 | ITEM 4 | 1,399.67 | | | | |
| 7 | ITEM 5 | 621,453.22 | | | | |
| 8 | ITEM 6 | 1,320,786.00 | | | | |
| 10 | TOTAL | | | | | |

C3:
123
MESSAGE LINE/COMMAND LINE
SPREADSHEET NAME

FIG. 3

CREATE  DESCRIBE  EDIT  CLEAR  VIEW  SORT  EDIT  PRINT  END  UNDO/REDO

|   | 1 | 2 | 3 | 4 | 5 | 6 |
|---|---|---|---|---|---|---|
| | | BUDGET | REPORT FOR | 1986 | | |
| 1 | | JANUARY | FEBRUARY | MARCH | APRIL | MAY |
| 3 | ITEM 1 | 999.99 | 123 | | | |
| 4 | ITEM 2 | 129.99 | | | | |
| 5 | ITEM 3 | 769.77 | | | | |
| 6 | ITEM 4 | 1,399.67 | | | | |
| 7 | ITEM 5 | 621,453.22 | | | | |
| 8 | ITEM 6 | 1,320,786.00 | | | | |
| 10 | TOTAL | | | | | |

|  | TITLE | TITLE | TITLE |
|---|---|---|---|
| TITLE | | | |
| TITLE | | | |
| TITLE | | | |

THIS PARAGRAPH CONTAINS A ONE-CELL FOR A TABLE __________

| THIS IS INFORMATION INSIDE THE FIRST CELL OF A TWO COLUMN BY ONE ROW TABLE. THE INFORMATION FROM THIS COLUMN WILL WRAP TO THE NEXT COLUMN WHEN THIS CELL IS FULL. THIS INFORMATION FROM THIS COLUMN WILL WRAP TO THE NEXT COLUMN WHEN THIS CELL IS FULL. THIS INFORMATION FROM THIS COLUMN WILL WRAP TO THE NEXT COLUMN WHEN THIS CELL IS FULL. THIS INFOR- | MATION HAS WRAPPED TO THE NEXT COLUMN. |
|---|---|

DECEMBER 1985

| SUNDAY | MONDAY | TUESDAY | WEDNESDAY | THURSDAY | FRIDAY | SATURDAY |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 VACATION | 24 VACATION | 25 CHRISTMAS DAY | 26 WORK HOLIDAY | 27 WORK HOLIDAY | 28 |
| 29 | 30 VACATION | 31 VACATION | 1 NEW YEAR'S DAY | | | |

METHOD FOR ASSISTING THE OPERATOR OF AN INTERACTIVE DATA PROCESSING SYSTEM TO ENTER DATA DIRECTLY INTO A SELECTED CELL OF A SPREADSHEET

This is a continuation of application Ser. No. 06/819,190, filed Jan. 16, 1986, which is now abandoned.

FIELD OF THE INVENTION

This invention relates in general to interactive data processing systems and in particular to an improved method for assisting the operator of such a system in entering data into cells of a spreadsheet that is being displayed by the system.

BACKGROUND ART

The term "interactive data processing system" generally describes a data processing system comprising a central processing unit which functions to store and process data, a display screen on which information from the system is displayed to the operator, and a keyboard which is used by the operator for entering information into the system. Such systems may also include a printer for producing hard copy output of selected information and one or more disk storage devices which function to transfer operating system programs, application programs, and user data between the system and the diskettes which provide off-line storage of such information.

The system is interactive in the sense of the interaction that occurs between the operator and the display screen which is determined primarily by the programs being executed by the central processing unit which, in turn, are selected by the operator. The significance to the system of keystroke data selected by the operator is dependent upon the particular state of the program being executed which is generally manifested to the operator by the information displayed to the operator. In other words, the same sequence of keystrokes can cause the system to react differently, depending on the state of the program being executed when that sequence is entered. In a similar fashion, the type and amount of information that is displayed to the operator affects, to a large degree, the amount of control the operator has over how a particular processing task is performed which, in turn, reflects on the overall performance of the system. The operator interface to the system is an important aspect of the overall system.

Personal computers currently being marked are prime examples of interactive data processing systems in which the operator interface is extremely important. An application program from a functional standpoint, may be excellent, but if the procedures required of the operator to interact with the application program are not "user friendly," the application program generally will not meet with wide acceptance in the market place. It is therefore important from both a performance and marketing standpoint that this interface be as friendly, logical, and natural as possible. These requirements reflect the fact that most operators of interactive personal computer systems have had a rather limited exposure to the technical details of the system hardware and the software. In addition, while the operator may be expected to be knowledgeable on several separate types of applications such as word processing, data base, spreadsheets, and graphics, the average operator generally is not involved in running all applications every day.

Most often, one or two applications need only be run on a periodic basis so that the operator is continually faced with a recall problem of what sequence of keystrokes are required to perform a given task in this particular application. The more natural the sequence is, the easier it is for the operator not to hesitate or make an erroneous entry in performing the task. Programs that are designed with these types of considerations for the operator, provoke less operator frustration and are generally considered "user friendly."

Certain applications, by the nature of their subject matter, are more complex than others. Most operators can relate easily to text processing type programs since they have been exposed to most of the subject matter and functions involved in these types of application programs. On the other hand, the subject matter of a spreadsheet type of program is generally less familiar to the average operator so that in addition to learning the steps involved in the user interface, there is an added element of learning various aspects of the subject matter itself. It is therefore even more important in spreadsheet type of programs that detailed aspects of the user interface be addressed from the standpoint of ease of learning and use.

A number of spreadsheet type programs are currently available for use with various personal computing systems. These programs generally display a so-called "spreadsheet," consisting of a number of columns and a number of rows, the columns being labeled alphabetically, from left to right and the rows being labeled numerically, from top to bottom. The width of the columns is expressed in terms of characters and in some spreadsheet programs, the width of each column can be set individually by the operator. The spreadsheet therefore comprises a number of "cells," the location of which is defined by the column and row, e.g., A17, E9, etc.

A cell is selected by the operator through the cursor positioning keys on the keyboard or in some programs, may be selected by keying in the cell location, preceded by an appropriate command from the operator, such as, "go to CxRx." In either case, the selected cell is highlighted and the system is in a state to perform some type of editing action specified by the operator on the selected cell. At this point in the program, the default function is one of data entry and the system is displaying a spreadsheet which is 80 characters wide and approximately 20 rows long (assuming a conventional 80 column, 24 line display). A line of information is also displayed at the top of the screen, setting forth the particular spreadsheet details, such as its name. Between the title line and the first row in the spreadsheet, there is generally also a data entry or prompt line that identifies the selected cell and provides an area where each character of data that is entered by the operator is immediately displayed. The data that is entered does not appear in the selected cell until the operator actuates the ENTER key.

This method of entering data in a selected cell is found to be frustrating to operators in some situations where the environment of the selected cell may influence how and where the data is entered in the cell.

In other cases, it has been found that because the operator's attention must be divided between two distinct areas of the screen, there is a tendency to create more errors, especially for operators who are not proficient touch typists. The present invention avoids the above-described problem.

SUMMARY OF THE INVENTION

In accordance with the present invention, an improved method for entering data directly into a selected cell of a spreadsheet is provided. The operator selects a cell in a conventional manner, such as by pointing to the cell with cursor positioning keys or by a mouse device which is provided with a select button which is pressed by the operator to advise the system of the selected cell. This action selects the cell. An editing "typing" cursor is automatically displayed at the first entry position. The contents in the cell are shown exactly as the operator keyed the data. That is, the data is not formatted or calculated. The editor includes a number of pre-established rules which are invoked by the system in response to the operator's action, depending on attributes that have been previously assigned to the cell. These attributes may include, for example, a multi-line cell or a cell in which horizontal scrolling is permitted, or an attribute which allows data being entered into the cell to wrap itself to a subsequent line in the event the data exceeds the line length of the cell.

It is therefore an object of the present invention to provide an improved method to assist the operator of an interactive data processing system in entering data into a spreadsheet.

A further object of the present invention is to provide a method for the operator of an interactive data processing system to enter data directly into a selected cell of a spreadsheet.

A further object of the present invention is to provide an improved method for the operator of an interactive data processing system to act directly on the data displayed in the selected cell of a spreadsheet during an editing operation.

Objects and advantages other than those mentioned above will become apparent from the following description when read in connection with the drawing.

DESCRIPTION OF THE PREFERRED EMBODIMENT

Figure 1:
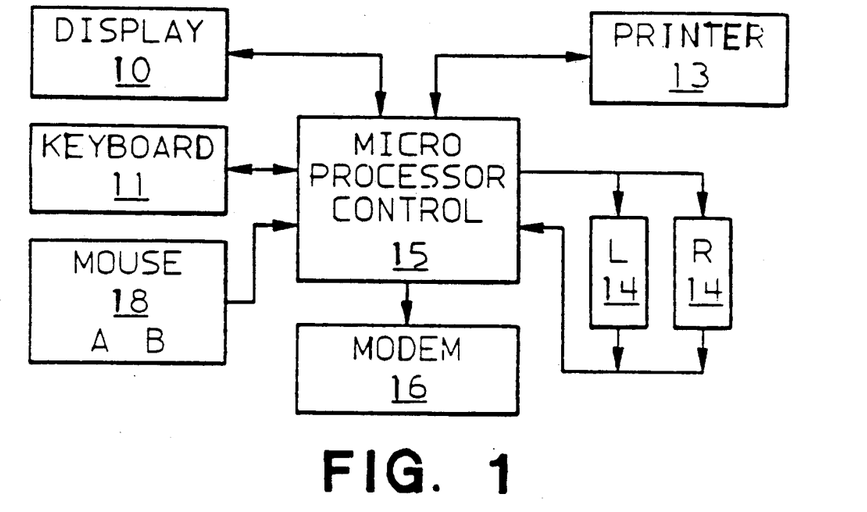
FIG. 1 is a block diagram of a typical interactive data processing system in which the method of the present invention may be advantageously employed.

FIG. 1 illustrates the general arrangement of a typical interactive data processing system. The system shown comprises a display device 10 for displaying information to the operator, a keyboard 11 which the operator uses to enter information including command and data into the system, a printer 13 which functions to provide hard copy output of information generated by the system and selected by the operator, a pair of diskette drives 14L and 14R which function to transfer information between the system and the magnetic storage diskettes that are removably associated with the diskette drives, and which store both program information, text information, and user data. System components 10, 11, 13, 14L, and 14R are connected, as shown in FIG. 1 to the microprocessor block 15, which functions as the overall control for the system and interconnects the various system components to perform their specific function at the appropriate time. The system of FIG. 1 also includes a modem 16 which functions to interconnect that system to other systems through various communication links.

Since the system of FIG. 1 is adapted to process spreadsheet applications, it should be assumed that display device 10 is capable of displaying an 80 character position line and 24 lines. An auxiliary input device 18 is also shown in FIG. 1, and is provided for permitting more rapid positioning of the cursor on the screen than might be obtainable by the cursor positioning keys on the keyboard 11. Such devices are well known in the art and for purposes of this description, it will be assumed that device 18 is a conventional mouse, equipped with two buttons or keys, 18A and 18B. Devices such as a data tablet having similar functions to the mouse could also be employed for input device 18.

Figure 2:
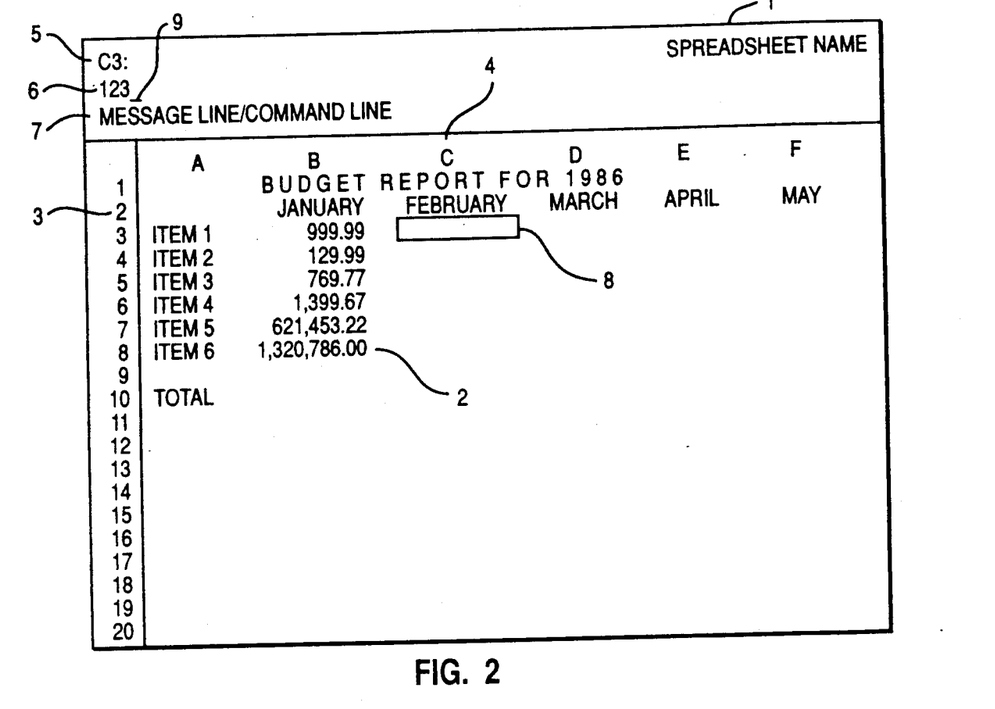
FIG. 2 is an illustration of a prior art spreadsheet, illustrating the results of a data entry operation.

Reference is now made to FIG. 2 of the drawings. This figure illustrates the general appearance of a traditional spreadsheet 1 as shown on display device 10 of FIG. 1 by an application program.

The spreadsheet 1 consists of a symmetrical arrangement of cells, for example, cell 2, which form a rectangular pattern consisting of rows 3 and rows 3. The columns 4 are labeled numerically, from top to bottom. Typically, the operator is given a fixed number of rows and columns, e.g., 2,048 rows by 256 columns, of which only 20 are shown within a conventional 80 column by 24 line display. The width of a column can be set individually by the operator and is defined in terms of characters. The height of a row is traditionally the height of a single line (character) and cannot be changed by the operator. Cells within the spreadsheet are referenced by the intersecting row and column names, e.g., A17, C18. The content of a cell may include formulas, calculations, numeric values or textual data.

In addition to spreadsheet 1, the application program also displays an information line 5 at the top of the screen, setting forth the particular spreadsheet details, such as the name of the spreadsheet and the selected cell name and actual cell contents. Following the information line 5, there is a data entry or prompt line 6 which provides an area where the data for the selected cell is entered and is immediately displayed. Line 7 is used to display valid commands and informational messages.

To select a cell to edit, the operator moves the cell cursor 8 using the cell advance keys on the keyboard (e.g., right, left, up, down advance keys), by keying the appropriate command on a command line, such as, "go to CxRx," or by using a pointing device such as a mouse which is provided with a select button which is pressed by the operator to advise the system of the desired cell. The application program highlights the selected cell and the application program is now ready to perform an editing action on the cell, as specified by the operator.

To edit a cell, the operator enters the data directly into the prompt line 6. A "typing" cursor 9 denotes the current entry position. As each character of data is entered, the data appears immediately in the prompt line 6. The data does not appear in the selected cell until the operator presses the ENTER key or advances to the next cell using the cursor advance keys. Cell 2 shows data which had previously been entered into the cell via the prompt line 6.

To re-edit a cell which already contains data, the operator must issue an explicit command which identifies to the program that the contents of the cell are about to be re-edited. The existing contents of the cell are shown in the prompt line 6 in its original form. The cell still displays the result of cell contents. The operator edits the actual cell contents as shown in the prompt line 6.

Figure 3:
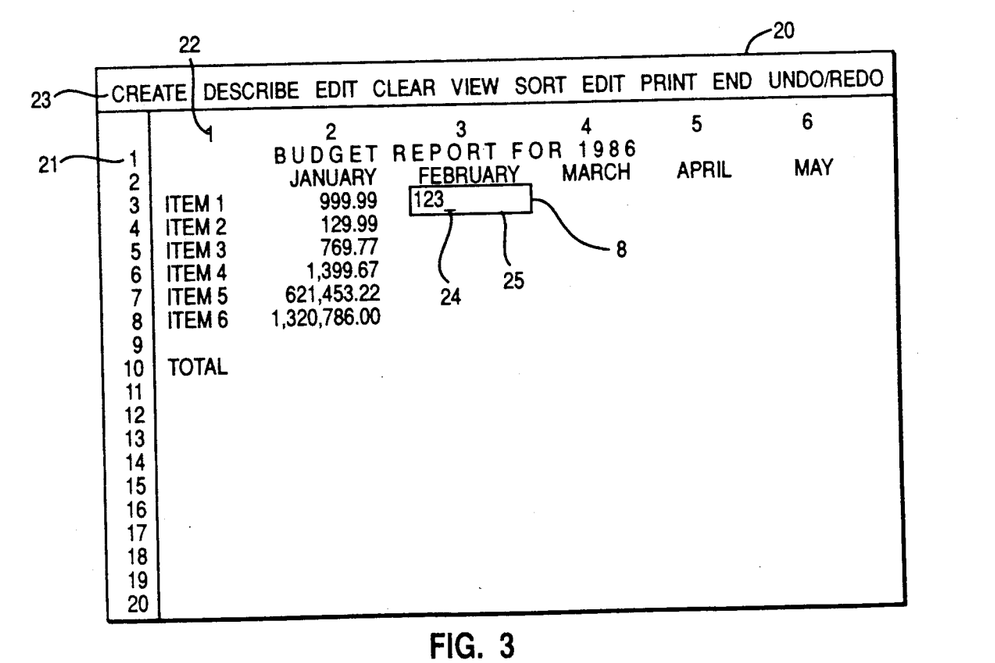
FIG. 3 is an illustration of a spreadsheet in which data is entered directly into a selected cell.

FIG. 3 illustrates a spreadsheet 20 similar to spreadsheet 1. Spreadsheet 20 has rows 21 and columns 22 labeled numerically and is displayed with commands 23 at the top of the screen and has NO prompt line. Cells are referenced by the row and column intersecting name, e.g., R1C1, R6C13.

To select a cell to edit in spreadsheet 20, the operator moves the cell cursor 8 to the desired cell by using the cursor advance keys on the keyboard (e.g., right, left, up, down advance keys), by keying the appropriate command on a command line, such as, "go to CxRx," or by using a pointing device such as a mouse to point at and select a cell by pressing a Select button on the mouse. The application program highlights the selected cell and positions a "typing" cursor 24 within the cell. The cell is now ready for editing.

Figure 4A:
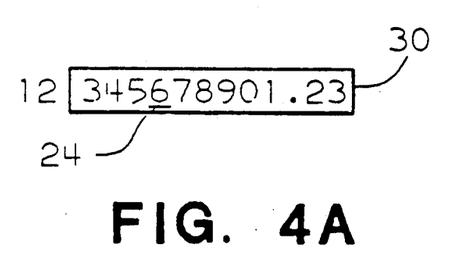
FIGS. 4a through 4d illustrate the selected cell from the spreadsheet of FIG. 3 during various aspects of data entry.
Figure 4B:
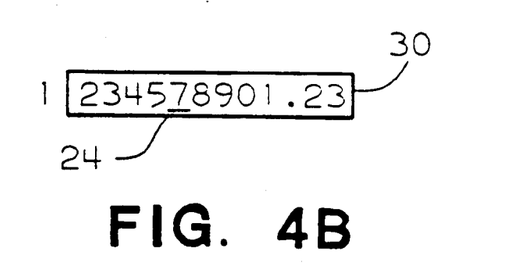
Figure 4C:
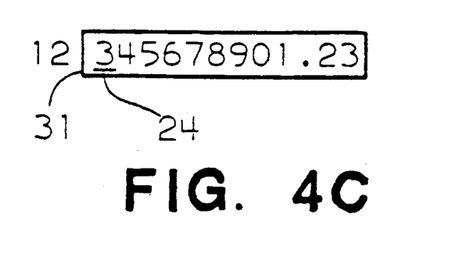
Figure 4D:
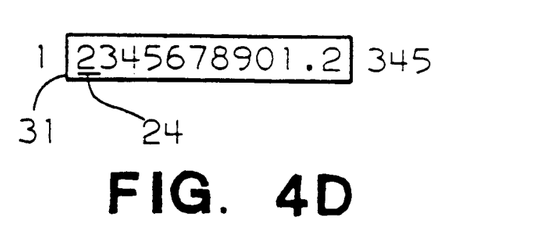

To edit the cell, the operator enters data directly into the cell. The "typing" cursor is initially positioned at the first character position within the cell. As the operator keys data, the "typing" cursor 24 moves one character to the right as shown in cell 25. If the operator reaches the right boundary position of a cell, the cell contents automatically scroll to the left one character at a time as shown in cell 30 of FIG. 4a. The operator may correct any editing mistakes at any time while entering data using the cell editing keys, e.g., backspace key, delete key. FIG. 4b shows the cell 30 after a character has been deleted. The cell editing keys, e.g., cursor right, left, up, down keys, may be used to move the "typing" cursor to other positions within the cell boundary. FIG. 4c shows the "typing" cursor 24 at the left cell boundary 31. If the operator attempts to go past the left cell boundary 31 and there is more data, the data will scroll as shown in FIG. 4d.

For operators accustomed to entering data in a prompt line or for entering long formulas, the operators may request that a prompt line be shown.

The operator may enter any type of data within the cell, e.g., textual, numbers, a formula, or a calculation. If the operator specified the type of format for the data within the cell to be a specific type, for example, all numeric or textual, the program will type check the data as the data is entered to make sure the data fits the format specified.

When editing of the cell is completed, the operator may press the Accept key to accept the data, move the cell cursor 8 of FIG. 3 to another cell using a cell advance key, or cancel the edit action.

If the Accept key is used, the application program displays the results of the cell data without advancing the cell cursor 8. This allows the user to see the results of the cell data without moving off the cell. If the user needs to re-edit the cell contents without reselecting the cell, the user may press the Accept key again which acts as a toggle key. The application program then displays the actual cell contents ready for editing.

If a cell advance key is used, the application program displays the results of the cell data and then advances the cell pointer to the next cell. If the data within the cell is textual or numerical data, the results will be shown with the formatting characteristics specified by the operator. If the data entered was a calculation, a formula, or an equation with cell referencing, the application program performs the calculation and then displays the results in the cell. When the operator reselects the cell for editing, the actual cell data as entered into the cell is shown to the operator.

The operator may also specify other characteristics for the data, such as, exponential, integer, dollar, percentage, etc. These formats are conventional for most spreadsheets.

To re-edit cell which already contains data, the user cursors to the cell, the data as entered before is shown in the cell, and the user can begin editing the cell.

Figure 5:
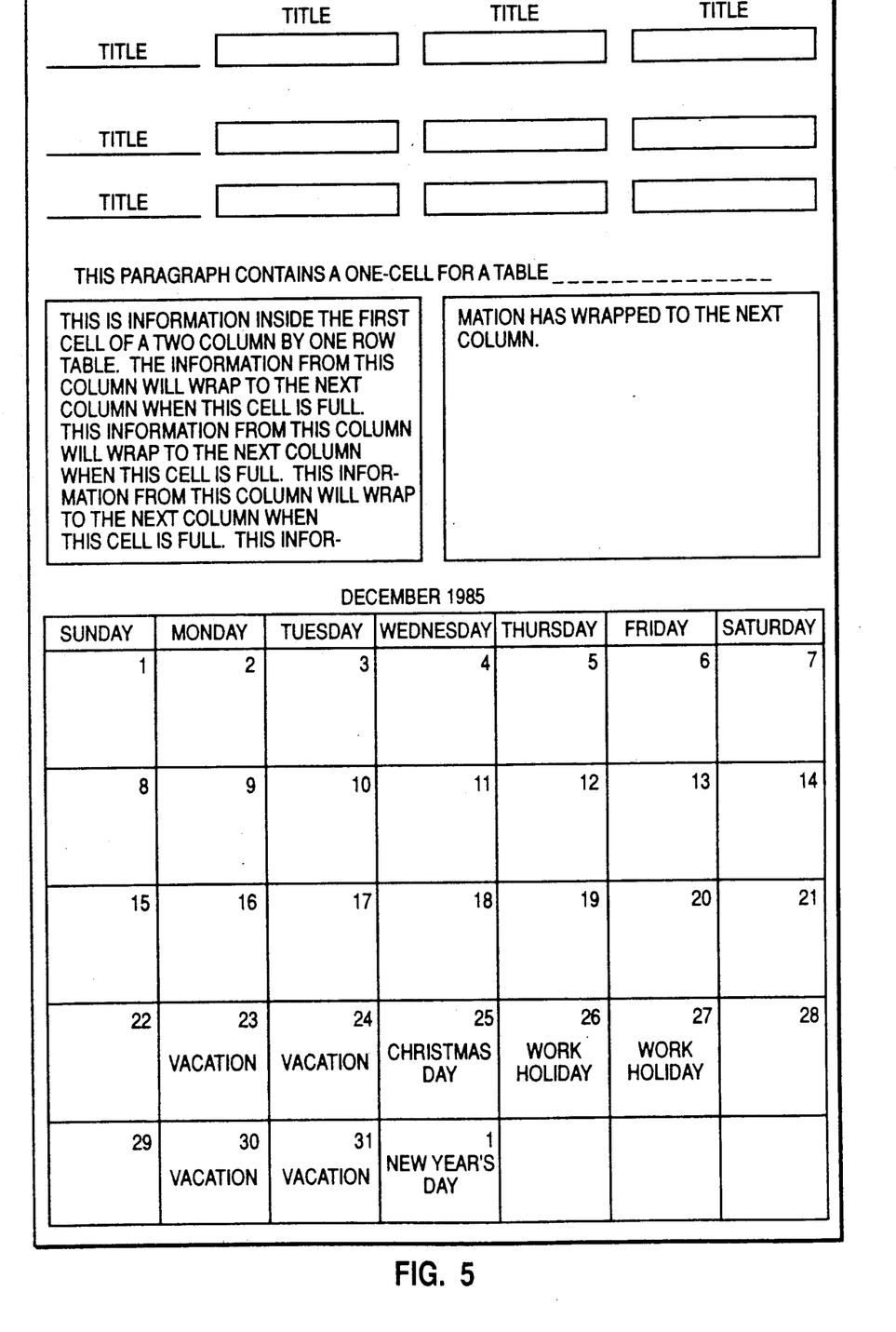
FIG. 5 illustrates a cell in which the height of the cell has been specified as ten lines and the data that was entered exceeded the length of one cell line.

FIG. 5 illustrates spreadsheets 33 and 34 which consists of cells which are more than one character (line) high with borders around the cells. Spreadsheet 33 contains a cell 35 with a height of 10 lines and the data that was entered exceeded the length of one cell line. A spreadsheet 32 is also shown with variable spacing between the rows and columns. This application has built-in the flexibility for designing spreadsheet layouts which are different from the traditional spreadsheet. The operator may specify the orientation of the rows and columns and whether a cell is single line or multiline. This flexibility lends itself well to other application orientations such as multi-column text, calendaring, statistical data tables, chart presentation tables, which lend themselves well to tabular type data with the functionality of the traditional spreadsheet. Since the user can enter data directly into the cell, the user is not constrained with the single prompt line provided by traditional spreadsheet applications.

DESCRIPTION OF PSEUDO CODE FOR DIRECT DATA ENTRY INTO A SPREADSHEET

Table 1 is an illustration of an application program useable by a processor in a workstation for interactively entering data directly into a cell of a spreadsheet. This program is in program design language (PDL) from which source and machine code are derivable. In the following, it is assumed that the workstation is under at least keyboard device control and that the operator has initiated an action requiring the application to provide a spreadsheet editing environment.

As shown in Table 1, the application calls a routine (CALL DISPLAY_SPREADSHEET) to display a spreadsheet on the screen. This routine positions the cell pointer on the first cell of the spreadsheet (e.g., R1C1) and highlights the cell. The routine returns a pointer to the first cell. The applications then waits for operator input from the keyboard (CALL GET_INPUT) and checks to see if keyboard input has been received.

If the INPUT_KEY is a cell advance key, the application determines if the cell had been modified. If the cell has been modified, the application calls a routine (CALL GET_RESULTS) to perform any necessary cell calculations, resolving of cell references or formulas, etc. The application then calls a routine (CALL FORMAT_DATA) to format the results in the formatting characteristics specified by the operator. The application then displays the results in the cell (CALL DISPLAY_CELL_RESULTS). The application then calls a routine (CALL DEHIGHLIGHT_CELL) to dehighlight the currently selected cell and advance the cell pointer to the next cell as specified by the cell advance key pressed (CALL MOVE_CELL_PTR). This routine also returns a pointer to the selected cell (CELL_PTR). The cell with the cell cursor is then highlighted (CALL HIGHLIGHT_CELL).

If the INPUT_KEY is the cell accept key, the application checks the accept key state. If the cell is currently showing the cell results, the application calls a routine (CALL DISPLAY_CELL_DATA) to display the actual cell data and sets the accept key state (ACCEPT_KEY_STATE). If the cell is currently showing the actual cell data, the application calls a routine (CALL GET_RESULTS) to perform any necessary cell calculations, resolving of cell references or formulas, etc. The application then calls a routine (CALL FORMAT_DATA) to format the results in the formatting characteristics specified by the operator. This application then displays the results in the cell (CALL DISPLAY_CELL_RESULTS) and sets the accept key state (ACCEPT_KEY_STATE).

If the INPUT_KEY is a data entry key, a routine is called to insert the character into the cell if in insert mode or to replace the character in the cell if in replace mode at the "typing" cursor position (CALL INSERT_INPUT_KEY). This routine performs cell boundary checking to determine if the data needs to be scrolled. If the cell is more than one character high, this routine performs any necessary character wrapping to the next line of the cell. This routine also performs any type checking of data to make sure the data entered into the cell is of the type specified by the operator (i.e., all textual, all numerical, etc.). A routine is then called (CALL DISPLAY_CELL_DATA) to update the cell contents on the display.

If the INPUT_KEY is a cell editing key, a routine is called to process the editing key (CALL EDIT_CELL_DATA). The editing keys allow the operator to move the typing cursor within the cell boundary or delete characters. This routine also performs cell boundary checking to determine if the data needs to be scrolled. If the cell is more than one character high, this routine performs any necessary cursor wrapping to the next line of the cell.

If the INPUT_KEY is a command key, the application calls a routine to process the command (CALL PROCESS_COMMAND) and returns a terminate editing flag (EDIT_COMPLETE) if the command selected terminates editing.

The application continues to wait and process keystrokes until the operator terminates the editing session (UNTIL EDIT_COMPLETE).

TABLE 1

PSEUDO CODE FOR DIRECT DATA ENTRY INTO A SPREADSHEET
CALL DISPLAY_SPREADSHEET (CELL_PTR)

```
REPEAT
. CALL GET_INPUT (INPUT_KEY)
. IF INPUT_KEY <> NULL THEN
. . CASE INPUT_KEY OF
. . . CELL_ADVANCE_KEY:
. . . . IF CELL_MODIFIED THEN
. . . . . CALL GET_RESULTS (CELL_PTR, CELL_RESULTS)
. . . . . CALL FORMAT_DATA (CELL_RESULTS)
. . . . . CALL DISPLAY_CELL_RESULTS (CELL_PTR, CELL_RESULTS)
. . . . ENDIF
. . . . CALL DEHIGHLIGHT_CELL (CELL_PTR)
. . . . CALL MOVE_CELL_PTR (CELL_PTR, INPUT_KEY)
. . . . CALL HIGHLIGHT_CELL (CELL_PTR)
. . . ACCEPT_KEY:
. . . . IF ACCEPT_KEY STATE = SHOWING_RESULTS THEN
. . . . . CALL DISPLAY_CELL_DATA (CELL_PTR)
. . . . . SET ACCEPT_KEY_STATE = SHOWING_DATA
. . . . ELSE
. . . . . CALL GET_RESULTS (CELL_PTR, CELL_RESULTS)
. . . . . CALL FORMAT_DATA (CELL_RESULTS)
. . . . . CALL DISPLAY_CELL_RESULTS (CELL_PTR, CELL_RESULTS)
. . . . . SET ACCEPT_KEY_STATE = SHOWING_RESULTS
. . . . ENDIF
. . . DATA_ENTRY_KEY:
. . . . CALL INSERT_INPUT_KEY (INPUT_KEY, CELL_PTR)
. . . . CALL DISPLAY_CELL_DATA (CELL_PTR)
. . . EDIT_KEY:
. . . . CALL EDIT_CELL_DATA (INPUT_KEY, CELL_PTR)
. . . . CALL DISPLAY_CELL_DATA (CELL_PTR)
. . . COMMAND_KEY:
. . . . CALL PROCESS_COMMAND (INPUT_KEY, EDIT_COMPLETE)
. . . ENDCASE
. ENDIF
UNTIL EDIT_COMPLETE
```

DESCRIPTION OF FLOW CHART FOR DIRECT DATA ENTRY INTO A SPREADSHEET

Figure 6:
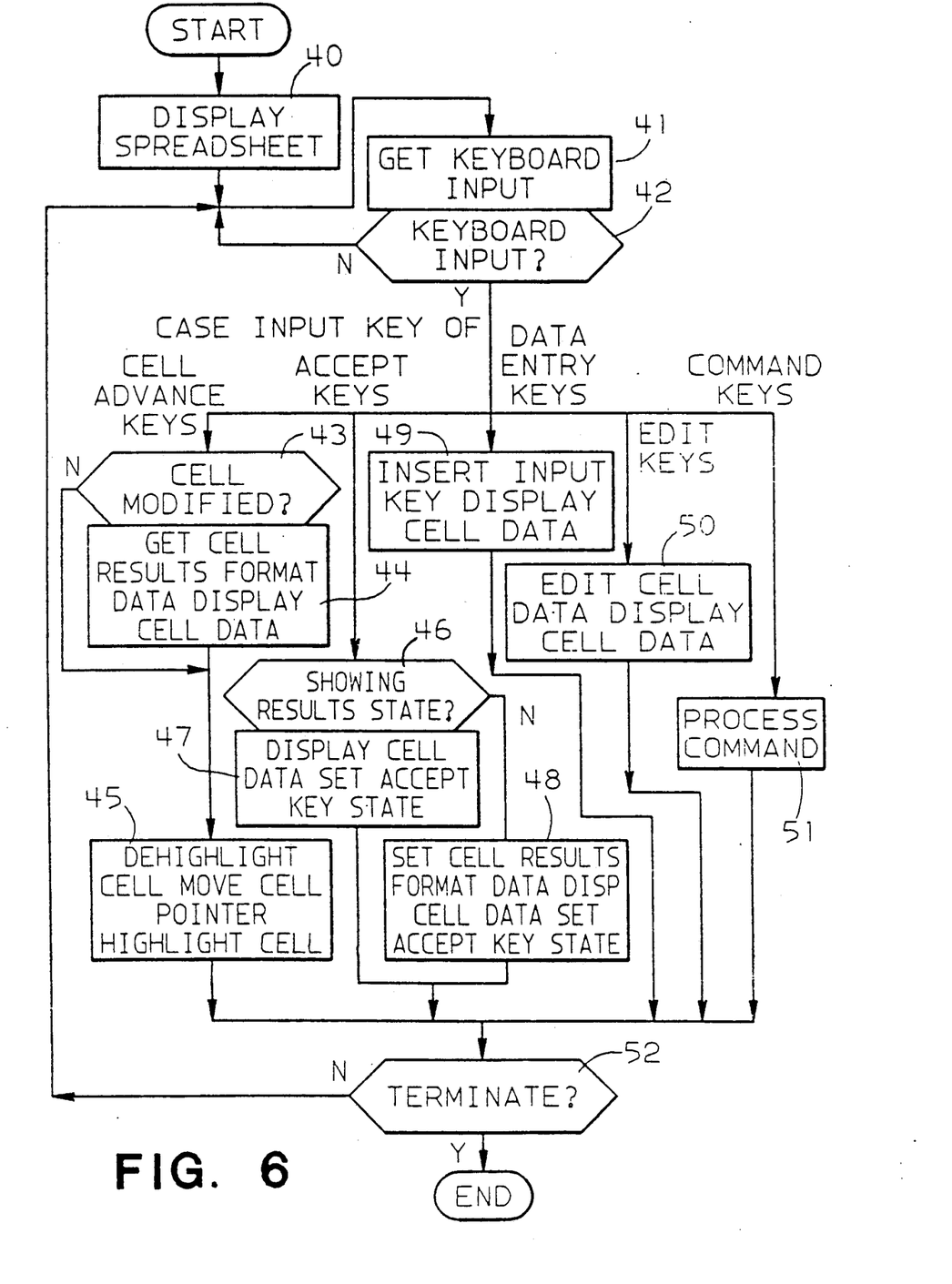
FIG. 6 is a flow chart setting forth the steps of the method for entry and editing of data directly in a selected cell.

The procedure just described is illustrated in the flow chart shown in FIG. 6 to which reference is now made. In order to start the spreadsheet editing session, the operator initiates the display of a spreadsheet. The actions required to do this are not detailed here as they have no relevance to the subject invention. The application displays a spreadsheet on the screen as shown in block 40. Once the operator is editing the spreadsheet, the application waits for keyboard input as shown in block 41. If keyboard input is received as shown in block 42, the application processes the keyboard input according to the following: If the input key is one of the cell advance keys, the application determines if the cell has been modified before advancing the cell pointer. This is shown in block 43. If the cell has been modified, the application performs the neccessary operations to get the results of the cell contents, formats the data in the operator specified formatting characteristics, and then displays the cell results as depicted in block 44. The application program then advances the cell pointer, dehigh-lights the current cell, and highlights the next cell. This is shown in block 45.

If the input key pressed is the accept key, the application program determines the state of the cell contents by testing to see if the cell results are being shown as depicted in block 46. If the results are being shown, the application program displays the cell data and then sets the accept key state as shown in block 47. If the cell data is being shown, the application performs the necessary operations to get the results of the cell contents, formats the data in the operator specified formatting characteristics, and then displays the cell results as depicted in block 48. The application also sets the accept key state.

If the input key is a data entry key, the application inserts the data into the cell at the "typing" cursor location if the operator is inserting data (insert mode). If the operator is replacing data (replace mode), the application replaces the character at the "typing" cursor location. The application performs any additional processing needed to scroll or wrap data within the cell. The application then displays the updated cell contents. This is shown in block 49.

If the input key is one of the cell editing keys, (e.g., delete, backspace), the application performs the editing operation on the cell data and redisplays the cell contents as shown in block 50.

If the input key pressed is a command key, the application processes the command as shown in block 51.

If no input key is received, the application continues to wait for keyboard input.

The application continues processing keyboard input until the operator terminates the editing session as shown in block 52.

While the invention has been particularly shown and described with reference to the preferred embodiment, it should be understood by those persons skilled in the art that various changes in form and detail may be made without departing from the spirit and scope of the invention.

We claim:

1. A method for assisting the operator of an interactive data processing system executing a spreadsheet application program in editing a displayed spreadsheet, said system including an input device operable by said operator for entering data into said system, a display device having a predetermined number of displayable lines and a predetermined number of displayable columns for displaying information entered into said system and a system processor for controlling said devices and for excuting said spreadsheet application program, said method comprising the steps of;

(1) displaying a spreadsheet on said display device by running said application program on said processor to depict a plurality of addressable cells arranged in a two dimensional array of addressable horizontal rows, each of which comprises a predefined number of said displayable lines, and addressable vertical columns, each of which comprises a predefined number of said displayable columns, said step of displaying including the further step of, (a) assigning to each said addressable horizontal row and each said addressable vertical column a unique symbol to permit each said cell to be addressed by the two said symbols assigned to said addressable row and column that intersect at said cell;

(2) selecting one of said addressable cells to be edited, including the further steps of, (a) said operator moving a system cursor to said one selected addressable cell, and (b) indicating to said system that said one said cell is to be selected, (3) displaying another cursor at a predetermined position within said one selected cell to indicate the display position in said selected cell where a first editing action of said operator will be displayed;

(4) assigning said one selected cell a first format attribute prior to selecting said one cell, (5) performing said editing action by entering characters into said one selected cell with said input device including the further steps of, (a) displaying as normal text each said character that is entered into said system, (b) moving said another cursor to the next adjacent unedited display position in said selected cell after the entry of each said character; and (c) keying in an accept signal after the last said character is entered, and (6) converting said characters of data displayed in said text mode into a different representation corresponding to said previously assigned format attribute only after said operator keys in said accept signal.

2. A method for assisting the operator of an interactive data processing system executing a spreadsheet application program in editing a displayed spreadsheet, said system including an input device operable by said operator for entering data into said system, a display device having a predetermined number of displayable lines and a predetermined number of displayable columns for displaying information entered into said system and a system processor for controlling said devices and for executing said spreadsheet application program, said method comprising the steps of;

(1) displaying a spreadsheet on said display device by running said application program on said processor to depict a plurality of addressable cells arranged in a two dimensional array of addressable horizontal rows, each of which comprises a predefined number of said displayable lines, and addressable vertical columns, each of which comprises a predefined number of said displayable columns, said step of displaying including the further step of, (a) assigning to each said addressable horizontal row and each said addressable vertical column a unique symbol to permit each said cell to be addressed by the two said symbols assigned to said addressable row and column that intersect at said cell;

(2) selecting one of said addressable cells to be edited, including the further steps of, (a) said operator moving a system cursor to said one selected addressable cell, and (b) indicating to said system that said one said cell is to be selected, (3) displaying another cursor at a predetermined position within said one selected cell to indicate the display position in said selected cell where a first editing action of said operator will be displayed;
(4) assigning said one selected cell a first format attribute prior to selecting said one cell including the steps of,
(5) performing said editing action by entering characters into said one selected cell with said input device including the further steps of,
 (a) displaying as normal text each said character that is entered into said system,
 (b) moving said another cursor to the next adjacent unedited display position in said selected cell after the entry of each said character; and
 (c) keying in an accept signal after the last said character is entered, and
(6) converting said characters of data displayed in said text mode into a different representation corresponding to said previously assigned format attribute only after said operator keys in said accept signal, said step of assigning a first format attribute includes the further step of,
 (a) assigning a formula attribute to said one cell to cause said characters that are entered in said one cell as a formula to be displayed in a formula format prior to said step of keying in said accept signal, and in which said step of converting includes the further step of,
 (b) calculating with said system the results of said formula, and
(7) displaying in said one cell said results of calculating said formula.

3. The method recited in claim 2 including the further step of,
 (A) re-displaying said initial formula whenever said one cell is reselected.

4. A method for assisting an operator of an interactive data processing system to enter data into one cell selected from a plurality of displayed cells, each of which has a unique address that is assigned in accordance with the spatial position of said cell in a two dimensional spreadsheet array, said method comprising the steps of;
(1) running a spreadsheet application program on said system to display said spreadsheet array of cells, said step of running including the further steps of,
 (a) assigning one cell a first format attribute prior to selecting said one cell, and
 (b) selecting said one cell including a first step of,
  (i) positioning a system cursor within said one cell, and a second step of,
  (ii) indicating to said system that said one cell is to be selected, and
(2) displaying a typing cursor at a predetermined display position within one said cell; and
(3) displaying each character of data that said operator enters into said system in sequential horizontal display positions within said one cell beginning with said predetermined display position in a normal text mode of said system,
(4) keying in an accept signal after the last said character of data is entered into said system,
(5) converting said data displayed in said text mode in said cell into a different related textual representation corresponding to said previously assigned format attribute only after said operator keys in said accept signal, and
(6) displaying in said one cell said converted data in said related textual representation.

5. A method for assisting an operator of an interative data processing system to enter data into one cell selected from a plurality of displayed cells, each of which has a unique address that is assigned in accordance with the spatial position of said cell in a two dimensional spreadsheet array, said method comprising the steps of;
(1) running a spreadsheet application program on said system to display said spreadsheet array of cells, said step of running including the further steps of,
 (a) assigning one cell a first format attribute prior to selecting said one cell, and
 (b) selecting said one cell including a first step of,
  (i) positioning a system cursor within said one cell, and a second step of,
  (ii) indicating to said system that said one cell is to be selected, and
(2) displaying a typing cursor at a preterrned display position within one said cell;
(3) displaying each character of data that said operator enters into said system in sequential horizontal display positions within said one cell beginning with said predetermined display position in a normal text mode of said system,
(4) keying in an accept signal after the last said character of data is entered into said system,
(5) converting said data displayed in said text mode in said cell into a different related textual representation corresponding to said previously assigned format attribute only after said operator keys in said accept signal, and
(6) displaying in said one cell said converted data in said related textual representation, said step of assigning a format attribute including the further step of,
 (a) assigning a formula attribute to said one cell to cause said data entered in said one cell as a formula to be displayed in a formula format prior to said step of keying in said accept signal, and in which said step of converting includes the further step of,
 (b) calculating with said system the results of said formula, and
(7) displaying in said one cell said results of calculating said formula.

6. The method recited in claim 5 including the further step of,
 (A) re-displaying said initial formula whenever said one cell is reselected.

* * * * *